PATENT OFFICE.

HANS LEMON, JAMES A. CAMERON, AND HARTZELL HAINER, OF MEMPHIS, TENNESSEE.

IMPROVEMENT IN ARTIFICIAL STONE.

Specification forming part of Letters Patent No. 163,386, dated May 18, 1875; application filed December 19, 1874.

*To all whom it may concern:*

Be it known that we, HANS LEMON, JAMES A. CAMERON, and HARTZELL HAINER, all residing in the city of Memphis, county of Shelby and State of Tennessee, have invented a composition stone for window caps, sills, and other ornamental work in buildings, also blocks for sidewalks, hitching-posts, stepping-stones, and other devices that are now made of stone for building purposes or otherwise, of which the following is a specification:

The first part of our invention relates to the ingredients that compose this stone, being four parts of clean sharp sand, entirely free of aluminum, two parts cement, one part dolomite limestone ground and powdered, one part chalk, one-half part litharge, and a half part hickory-wood ashes. These ingredients are to be heated, thoroughly mixed, and sifted together preparatory to being worked into a stiff plastic state by adding silicate of soda and water in equal parts of each. This also must be heated, and to give this plastic mass any color, say, red, use oxide of iron, blue, ultramarine blue, gray white zinc-dust, gray iron filings, or copperas-water, and black sulphate of antimony.

The second part of our invention relates to the mode of filling our molds, as described in first part of specification, which is the tamping and pressing the same in molds, or if worked otherwise in a stiff plastic state, forming a solid stone freed from imperfections or blubbers, and also by this tamping and pressing to make a more solid flinty stone.

The third part of our invention relates to the mode of treating these stones, when fully set and dry, to a warm bath of one-half part water and a half part silicate of soda, to allow them to remain twenty-four hours; then again to allow them to be exposed to the air and heat of the sun; then to place them again in a bath of lime-water, when they are again exposed to the air and heat of the sun, when they are again placed in a warm bath of one-half part of silicate of soda and a half part water, and allowed to remain twenty-four hours, when they are ready for use, after washing them with salt and water to remove the crystallization of the soda. When used on sidewalks, when the walks are laid in a plastic state and allowed to nearly dry, they are washed first with half part silicate of soda and a half part water, applied warm, and allowed to stand twenty-four hours, and then washed in lime-water, and allowed to dry twenty-four hours, when they are again washed with a half part of silicate of soda and a half part water, as before.

Take four parts sharp clean sand, free from all aluminum matter; any cement now in use, one part; dolomite limestone, powdered, one part; powdered chalk, one part; litharge, one-half part; hickory-wood ashes, one-half part, mixed and sifted thoroughly together, and heated while dry; then mix this compound into a stiff plastic state by adding heated silicate of soda, half part, and water one-half part, to be tamped and pressed into molds, so as to make a close-grained flinty stone, and, after drying for two or three days, to be placed in warm baths of a half part silicate soda and a half part water, where they are to remain twenty-four hours; then allowed to dry in the sun and air; then placed in a bath of lime-water, to remain twenty-four hours; then allowed to dry twenty-four hours, when they are again placed in a warm bath of a half part silicate of soda and a half part of water. When removed from this bath, they are washed in salt-water or brine to remove the soda from the face of same, when they are ready for use.

We do not claim the invention of making artificial stone, or the making of artificial stone with sand, cement, and silicate of soda; but What we do claim is—

Stone made of sharp sand, cement, dolomite limestone, powdered chalk, litharge, hickory-wood ashes, mixed with silicate of soda, and lime-water, when all these ingredients are used in combination, in the proportion hereinbefore stated, and the mode of treating the stone by warm baths of silicate of soda and lime-water alternately and washing in lime, substantially as and for the purposes described.

HANS LEMON. [L. S.]
JAMES A. CAMERON. [L. S.]
HARTZELL HAINER. [L. S.]

Witnesses:
EUGENE LEHMAN,
W. R. SIMS.